No. 838,361. PATENTED DEC. 11, 1906.
W. M. SCHWARTZ.
MACHINE FOR TREATING TOBACCO.
APPLICATION FILED DEC. 7, 1905.
3 SHEETS—SHEET 2.
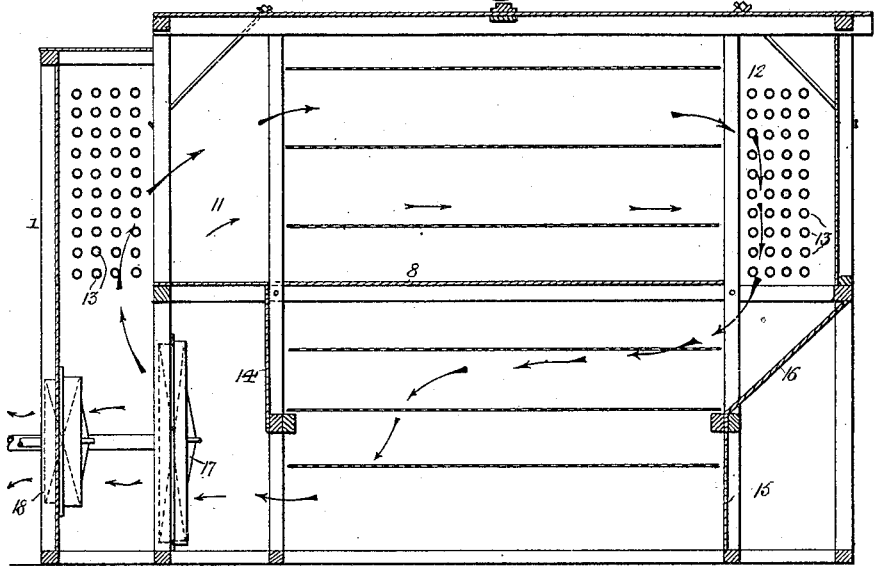
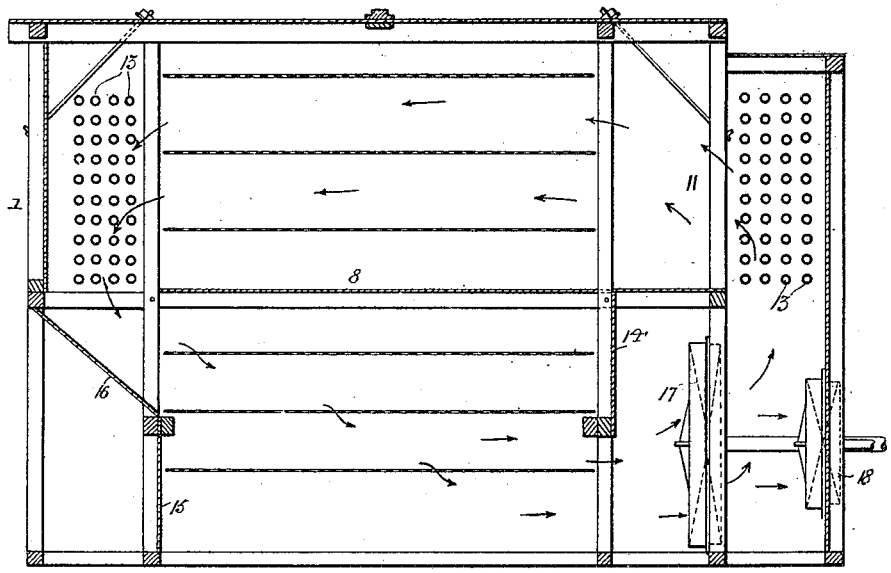
Witnesses:
Augustus B. Copps
Titus H. Irons
Inventor:
Walter M. Schwartz
by his Attorneys,
Howson & Howson No. 838,361. PATENTED DEC. 11, 1906.
W. M. SCHWARTZ.
MACHINE FOR TREATING TOBACCO.
APPLICATION FILED DEC. 7, 1905.

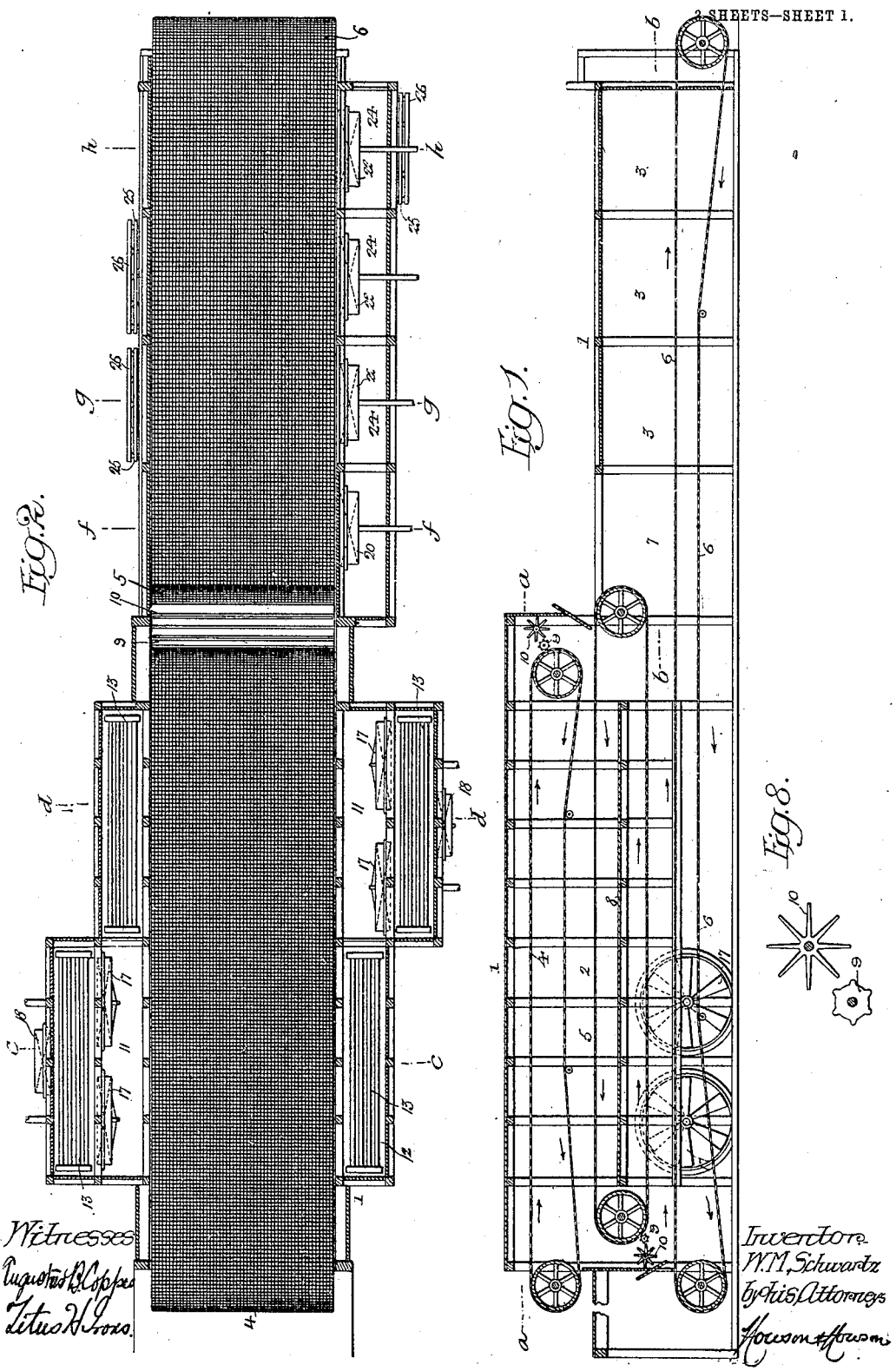

3 SHEETS—SHEET 3.

Witnesses:
Augustus B. Coppes
Titus H. Lono.

Inventor:-
Walter M. Schwartz.
by his Attorneys
Howson & Howson

UNITED STATES PATENT OFFICE.

WALTER M. SCHWARTZ, OF PHILADELPHIA, PENNSYLVANIA, ASSIGNOR TO THE PHILADELPHIA TEXTILE MACHINERY COMPANY, OF PHILADELPHIA, PENNSYLVANIA, A CORPORATION OF PENNSYLVANIA.

MACHINE FOR TREATING TOBACCO.

No. 838,361.      Specification of Letters Patent.      Patented Dec. 11, 1906.

Application filed December 7, 1905. Serial No. 290,777.

*To all whom it may concern:*

Be it known that I, WALTER M. SCHWARTZ, a citizen of the United States, residing in Philadelphia, Pennsylvania, have invented certain Improvements in Machines for Treating Tobacco, of which the following is a specification.

The object of my invention is to so construct a machine for drying and ordering or moistening tobacco that the thorough drying of the tobacco can be effected without breaking the leaves or dislodging them from the conveyer, passage of the tobacco from the drying to the ordering machine being effected without handling the tobacco, and the entire operation being facilitated and perfected.

Figure 5:
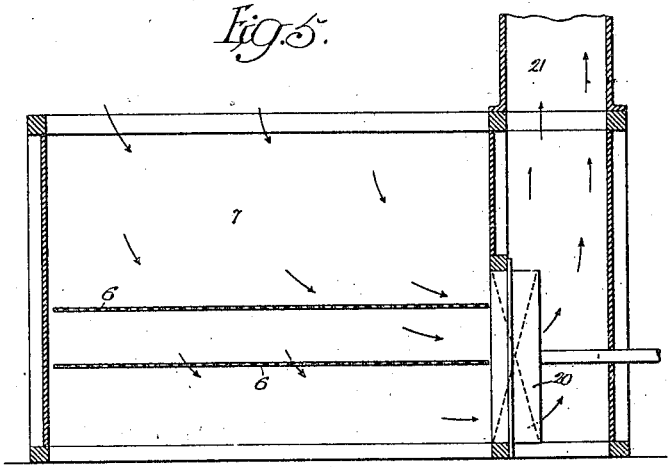
Figure 6:
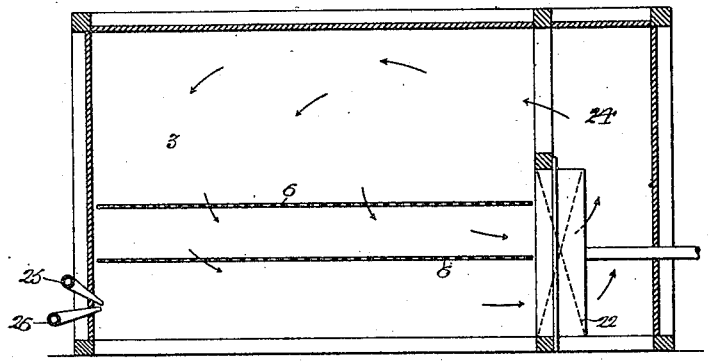
Figure 7:
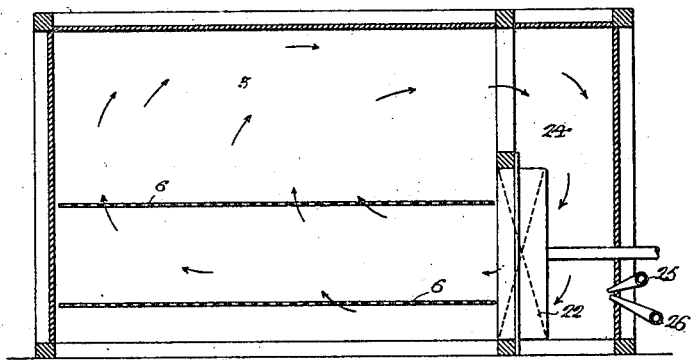

In the accompanying drawings, Figure 1 is a longitudinal section of a tobacco drying and ordering machine constructed in accordance with my invention. Fig. 2 is a sectional plan view of the machine, partly on the line $a\,a$ and partly on the line $b\,b$, Fig. 1. Fig. 3 is an enlarged transverse sectional view on the line $c\,c$, Fig. 2. Fig. 4 is an enlarged transverse sectional view on the line $d\,d$, Fig. 2. Fig. 5 is an enlarged transverse section on the line $f\,f$, Fig. 2. Fig. 6 is an enlarged transverse section on the line $g\,g$, Fig. 2. Fig. 7 is an enlarged transverse section on the line $h\,h$, Fig. 2, and Fig. 8 is an enlarged view of certain elements of the machine.

In the preparation of tobacco, especially that intended for manufacture into plugs, the tobacco-leaves, usually after being stripped, are sweetened and dipped into a licorice solution, and they must then be dried and afterward moistened to such a degree as to render them flexible enough to withstand without breaking the subsequent manipulation to which they are subjected, such moistening operation being known as "ordering."

The dipped tobacco-leaves are sticky and adhere so closely that it is difficult to thoroughly dry the same by means of currents of heated air, and as the tobacco becomes brittle during the drying operation the bunches of leaves cannot without breakage be opened up by means such as those employed in machines for treating cotton or other textile fibers.

The purpose of my invention has been to devise a machine which would overcome the above objections and would also effect the entire operation of drying, cooling, and ordering, instead of using separate machines for drying and ordering, as heretofore, thus not only economizing space, but also preventing the breakage of the tobacco-leaves or other injury thereto, such as would be caused by handling them when they are dry and brittle, as in conveying them from a drying to an ordering machine.

In the drawings, 1 represents a casing containing a drying-compartment 2 and an ordering or moistening compartment 3, these compartments communicating freely with one another through an intermediate or cooling compartment 7, as shown in Fig. 1. The machine is provided with three endless conveyer belts or aprons 4, 5, and 6, which are of perforated sheet metal, wire-gauze, open-meshed cloth, or other foraminous or permeable material, these three endless conveyer-aprons being disposed one above another and the upper and intermediate aprons extending only throughout the drying-compartment 2 of the machine, but the lowermost apron 6 extending throughout the drying, cooling, and ordering compartments 2, 7, and 3, as shown in Fig. 1.

The drying-compartment of the machine is divided by a central transverse partition 8 into upper and lower chambers, the upper chamber containing the upper apron 4 and the conveyer-run of the intermediate apron 5 and the lower chamber containing the lower apron 6 and the lower run of the intermediate apron 5.

The supporting and driving pulleys for the respective endless aprons are so disposed, as shown in Fig. 1, that the uppermost or primary receiving-apron projects beyond the receiving end of the machine, so that the bunches of tobacco-leaves after having been dipped can be laid upon the upper run of said apron and carried thereby into the upper portion of the drying-compartment 2 of the machine, said upper apron, after carrying the tobacco through the drying-compartment from front to rear, delivering it onto the upper run of the intermediate apron 5, whereby it is returned to the front of the machine and is in like manner delivered onto the upper run of the lower apron 6, which again carries it rearwardly through the drying-compartment of the machine, and also through the cooling-compartment 7 and ordering-compartment 3 to the delivery end of the machine, from which the tobacco is discharged in proper condition for further handling.

The aprons 4 and 5 are so speeded that the tobacco will not be thoroughly dried while on the same, the completion of the drying operation being reserved for the lowermost apron 6. Hence where the tobacco passes from the upper apron to the intermediate apron, or from the latter to the lower apron, it can be acted upon so as to open up or separate from each other the adhering leaves, and thus provide for the thorough drying of each leaf before it passes from the drying-compartment on the lower apron 6. The mechanism for this purpose comprises a lifter-roll 9 and a separator or opener 10, as shown in Fig. 8, the lifter-roll having longitudinal surface ribs, which operate in proximity to the apron where the latter passes around its supporting and driving drum, and thereby lift the bunches of leaves from the surface of the apron and pass them over for the action of the separating or opening device 10, which consists of a shaft having a series of radially-projecting fingers, blades, or beaters, whose blows upon the leaf-bunches tend to separate the leaves from one another as the latter are passing from the upper to the intermediate apron, or from the latter to the lowermost apron, the consequence being that the matting together of the leaves is prevented and the free access of air to each leaf is permitted, thus effecting a thorough drying of said leaves before they enter the cooling and ordering compartments of the machine.

On each side of the drying-compartment of the machine are a pair of air-heating chambers 11 and 12, each of these air-heating chambers containing a group of steam-heated pipes 13 or other air-heating device. The upper portion of each air-heating chamber communicates with the upper portion of the drying-compartment, but the lower portion of each chamber 11 is cut off, by means of a vertical partition 14, from that portion of the drying-compartment between the central partition 8 and the upper run of the lower conveyer-apron 6, and the lower portion of each heating-chamber 12 is cut off, by means of partitions 15 and 16, from communication with that portion of the drying-compartment below the upper run of the lower conveyer-apron 6, as shown in Figs. 3 and 4.

In each heating-chamber 11 is a rotary fan 17, which causes circulation of air through the drying-chamber in the direction indicated by the arrows, Figs. 3 and 4—that is to say, transversely across the conveyer-runs of the upper aprons 4 and 5 and downwardly through the conveyer-run of the lowermost apron 6, so that action of the air upon the tobacco-leaves lying upon the conveyer-run of said lower apron does not tend to dislodge the same and carry them off into the fan, as it would if the flow of air was transversely across the conveyer-run of the lower apron, since the tobacco-leaves lying upon the latter are so dry that they might be lifted and carried away by such a transverse air-current.

As shown in the drawings, the receiving end of the drying-compartment has the air-heating chamber 11 on the left-hand side of the same and the air-heating chamber 12 on the right-hand side; but these relations are reversed in the more advanced portion of the drying-compartment, with consequent reversal in the transverse flow of the air across the conveyer-runs of the upper and intermediate aprons, as will be noted on an inspection of Figs. 3 and 4. The purpose of this reversal of flow is to insure uniform drying of the tobacco-leaves on said aprons, there being a tendency of the tobacco to dry more rapidly on that side of the drying-compartment at which the heated air enters. Hence it will be evident that the reversal of flow corrects this unequal condition and aids materially in securing the uniform drying of the tobacco.

In order to prevent the saturation of the heated air with moisture taken up thereby from the wet tobacco, it is advisable to discharge from the machine a certain portion of the air which has been circulated over and through the tobacco, the saturated air thus removed being replaced by fresh air, which enters through the various openings in the casing of the machine, and thus serves to prevent the overloading with moisture of the heated air which is circulated through the drying-compartment. For this purpose an exhaust-fan 18 is located in the outer casing of each of the heating-chambers 11, which fan may discharge into a conduit leading to any suitable outlet. The use of the partition 14 is necessary only because of the disposition of the lower conveyer-apron 6 close to the bottom of the drying-compartment of the machine. When said conveyer is higher than the fan 17, the partition 14 will not be needed, and the fan can be located close to the conveyer, the width of the heating-chamber 11 being correspondingly reduced.

The lower conveyer-apron 6 serves to carry the thoroughly-dried tobacco from the drying-compartment first through the cooling-compartment 7 and then through the ordering-compartment 3 of the machine, there being no disturbance or agitation of the tobacco-leaves during such travel, as they are now so dry as to be tender and brittle, and therefore liable to breakage or other injury if moved about.

The cooling-compartment 7 is open at the top for the inflow of air, but has at one side an exhaust-fan 20, which causes a continual flow of air through the compartment and through the tobacco on the conveyer-apron, the air being then discharged into a conduit 21, by which it is conveyed to any suitable point of exit. (See Fig. 5.)

The ordering-compartment is not open to the atmosphere at the top, but is provided with a series of fans 22 at one side, as shown in Figs. 6 and 7, so as to cause circulation of air through the ordering-compartment and through a chamber 24 at one side of the same, two of the fans being so constructed as to cause flow of air downwardly through the tobacco, as shown in Fig. 6, and the final fan of the series being so constructed as to cause flow of air upwardly through the tobacco, as shown in Fig. 7.

Each of the air-circulating systems of the ordering-compartment is provided with a vaporizer or atomizer—such, for instance, as a liquid-supply pipe 25 and steam-supply pipe 26—with properly-disposed nozzles, as shown in Figs. 6 and 7, for combining a spray of liquid with the flowing current of steam, and thus imparting the proper degree of moisture to the tobacco in its passage through the ordering-compartment, and other spraying devices may be used, if desired.

I claim—

1. The combination, in a machine for treating tobacco, of a series of conveyers disposed one above another and delivering one to another, with means for causing flow of air transversely across the tobacco on the upper conveyer or conveyers, and downwardly through the tobacco on a final conveyer, substantially as specified.

2. The combination, in a machine for treating tobacco, of an endless conveyer, a lifter-roll operating in conjunction therewith to raise the tobacco from the surface of the conveyer, and a beater for discharging the tobacco from said lifter-roll, substantially as specified.

3. The combination in an apparatus for treating tobacco, of a drying-compartment and an ordering-compartment, a conveyer constructed to carry the tobacco without material disturbance through said compartments, with a primary drying apparatus through which the tobacco is traversed and from which it is discharged onto the said conveyer which passes through the drying and ordering compartments, substantially as described.

4. The combination, in a machine for treating tobacco, of a casing containing a drying-compartment and an ordering-compartment, with a series of conveyers disposed one above another in the drying-compartment and discharging one onto another, the lower conveyer being constructed to carry the tobacco without disturbance through the drying and ordering compartments, substantially as specified.

5. The combination, in a machine for treating tobacco, of a casing containing a drying-compartment, an ordering-compartment, and a cooling-compartment, with a series of conveyers disposed one above another in the drying-compartment and discharging one onto another, the lower conveyer being constructed to carry the tobacco without disturbance through the drying, cooling and ordering compartments, substantially as specified.

6. The combination in an apparatus for treating tobacco, of a drying-compartment and an ordering-compartment, a conveyer constructed to carry the tobacco without material disturbance through said compartments, a primary drying apparatus through which the tobacco is traversed and from which it is discharged onto the final conveyer which passes through the drying and ordering compartments, and means for opening the bunches of adhering tobacco before being placed on the final conveyer, substantially as described.

7. The combination, in a machine for treating tobacco, of a casing containing a drying-compartment and an ordering-compartment in communication with each other, a series of conveyers disposed one above another in the drying-compartment and discharging one onto another, the lower conveyer being constructed to carry the tobacco without disturbance through the drying and ordering compartments, substantially as specified.

8. The combination, in a machine for treating tobacco, of a casing containing a drying-compartment, a cooling-compartment and an ordering-compartment, said ordering-compartment communicating with the drying-compartment through the cooling-compartment, and a series of conveyers disposed one above another in the drying-compartment and discharging one onto another, the lower conveyer being constructed to carry the tobacco without disturbance through the drying, cooling and ordering compartments, substantially as specified.

9. The combination in an apparatus for treating tobacco, of a drying-compartment and an ordering-compartment, a conveyer constructed to carry the tobacco without material disturbance through said compartments, with a primary drying apparatus through which the tobacco is traversed and from which it is discharged onto the final conveyer which passes through the drying and ordering compartments, and means for opening the bunches of tobacco while passing through the primary drying apparatus so that it is not necessary to disturb the tobacco while on the final conveyer, substantially as described.

In testimony whereof I have signed my name to this specification in the presence of two subscribing witnesses.

WALTER M. SCHWARTZ.

Witnesses:
 WALTER CHISM,
 JOS. H. KLEIN.